United States Patent [19]
Hirayama et al.

[11] Patent Number: 6,154,806
[45] Date of Patent: *Nov. 28, 2000

[54] METHOD FOR RECORDING DIGITAL SIGNALS ON MULTIPLE-LAYERED DISKS

[75] Inventors: Hiroshi Hirayama; Osamu Kawamae; Masayuki Hirabayashi; Yutaka Nagai; Toshifumi Takeuchi, all of Yokohama, Japan

[73] Assignee: Hitachi, Ltd., Tokyo, Japan

[*] Notice: This patent is subject to a terminal disclaimer.

[21] Appl. No.: 09/339,816

[22] Filed: Jun. 25, 1999

Related U.S. Application Data

[60] Continuation of application No. 09/084,931, May 28, 1998, Pat. No. 6,076,135, which is a division of application No. 08/669,245, Jun. 24, 1996, Pat. No. 5,966,721.

[30] Foreign Application Priority Data

Jun. 26, 1995 [JP] Japan .................................. 7-158931

[51] Int. Cl.$^7$ ........................................ B11B 7/24
[52] U.S. Cl. ................... 711/4; 711/111; 711/112; 360/39; 360/42; 360/52; 360/54; 360/70; 360/72.1
[58] Field of Search ................. 711/4, 111–112, 711/170–173; 360/39–54, 70, 72.1, 72.2

[56] References Cited

U.S. PATENT DOCUMENTS

| | | | |
|---|---|---|---|
| 5,293,565 | 3/1994 | Jaquette et al. | 369/32 |
| 5,428,597 | 6/1995 | Satoh et al. | 369/275.1 |
| 5,523,903 | 6/1996 | Hetzler et al. | 360/77.08 |
| 5,608,715 | 3/1997 | Yokogawa et al. | 369/275.1 |
| 5,661,848 | 8/1997 | Bonke et al. | 711/112 |
| 5,966,721 | 10/1999 | Hirayama et al. | 711/4 |

FOREIGN PATENT DOCUMENTS

| | | | |
|---|---|---|---|
| 0593032 | 4/1994 | European Pat. Off. | G11B 20/12 |
| 0715301 | 6/1996 | European Pat. Off. | |
| 3828519 | 3/1990 | Germany | G11B 23/30 |
| 4023148 | 1/1991 | Germany | G11B 5/012 |
| 62-42343 | 2/1987 | Japan . | |
| 2-103732 | 4/1990 | Japan . | |
| 6-236555 | 8/1994 | Japan . | |
| 8-45195 | 2/1996 | Japan . | |
| 8-96406 | 4/1996 | Japan . | |
| 8-212561 | 8/1996 | Japan . | |
| 2235565 | 3/1991 | United Kingdom | G11B 20/12 |

OTHER PUBLICATIONS

*Patent Abstracts of Japan*, English abstract of Japanese reference 62–42343 published on Feb. 24, 1987.
*Patent Abstracts of Japan*, English abstracts of Japanese reference 2–103732 published on Apr. 16, 1990.
*Nikkei Byte*, Sep. 1994, p. 146 (in Japanese).

(List continued on next page.)

*Primary Examiner*—Do Hyun Yoo
*Assistant Examiner*—Than Nguyen
*Attorney, Agent, or Firm*—Antonelli, Terry, Stout & Kraus, LLP

[57] ABSTRACT

A method of recording digital signals on a disk having at least a first recording surface and a second recording surface. The digital signals are in the form of a data frame including a lead-in block and n data blocks. The lead-in block has a same format as the n data blocks. The method includes the steps of assigning n block addresses to respective ones of the n data blocks, assigning, to each of the n data blocks, information identifying an area on the disk in which a respective one of the n data blocks is to be recorded, recording m data block (0<m<n) of the n data blocks on the first recording surface of the disk, recording remaining (n–m) data blocks of the n data blocks on the second recording surface of the disk, and recording the lead-in block at the head of the data frame. The lead-in block includes information identifying an area on the disk in which the lead-in block is to be recorded, a number of recording surfaces, the block address of one of the m data blocks recorded last on the first recording surface, and the block address of a last one of the n data blocks in the data frame.

5 Claims, 4 Drawing Sheets

OTHER PUBLICATIONS

"Confidence in Unique Standards of DVDs", *Nikkei Sangyo Shinbun*, Feb. 24, 1995 (in Japanese).

"CD–ROM, CD–I und Video–CD", *Elektor*, Mar. 1995, pp. 52–56 (in German).

"Second Stage of Struggle for DVD Standards", *Nihon Keizai Shinbun*, Apr. 20, 1995 (in Japanese).

*Nikkei Byte*, Sep. 1995, pp. 129–130 (in Japanese).

*Patent Abstracts of Japan*, English abstract of Japanese reference 8–45195 published on Feb. 16, 1996.

*Patent Abstracts of Japan*, English abstract of Japanese reference 8–96406 published on Apr. 12, 1996.

*Patent Abstracts of Japan*, English abstract of Japanese reference 8–212561 published on Aug. 20, 1996.

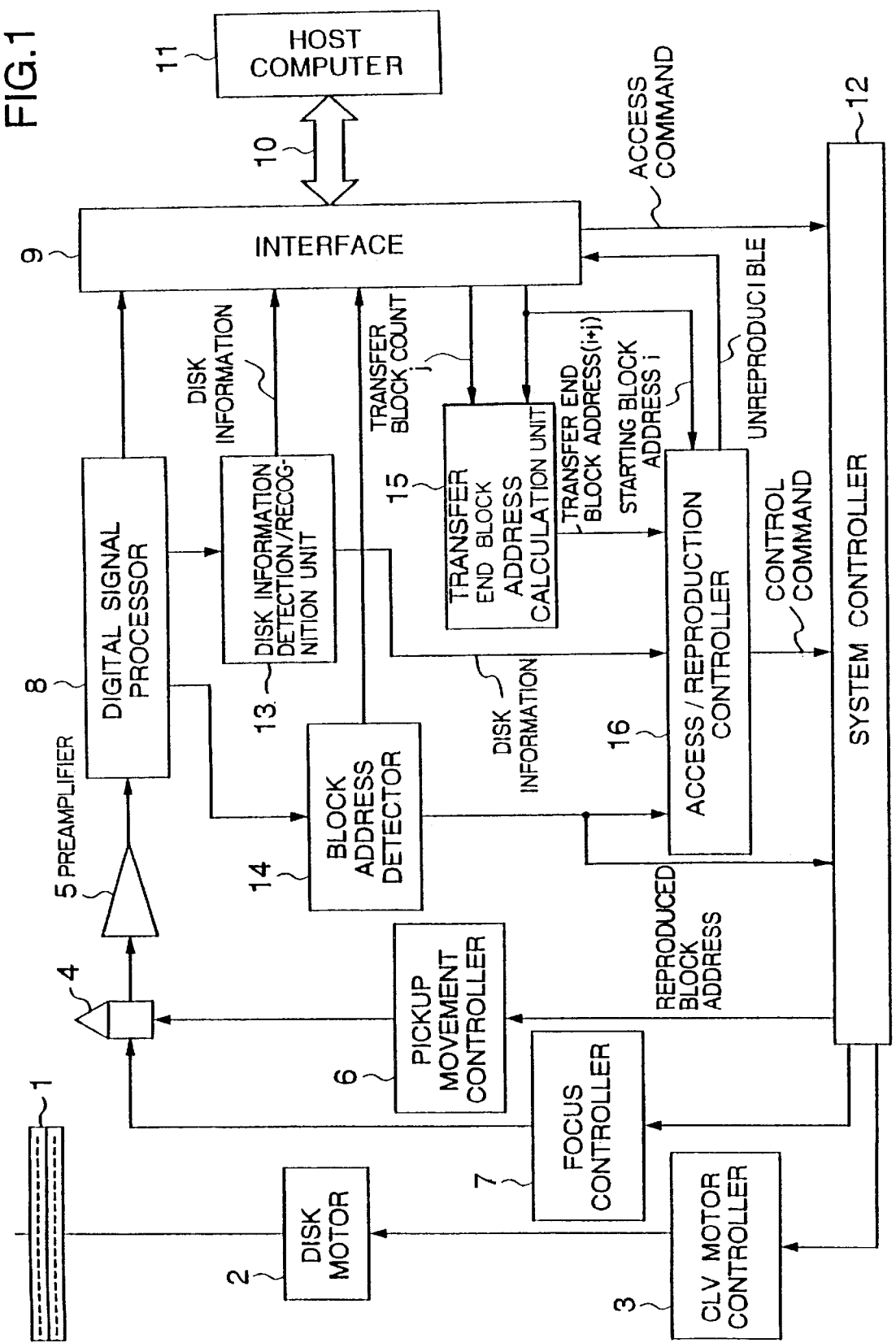

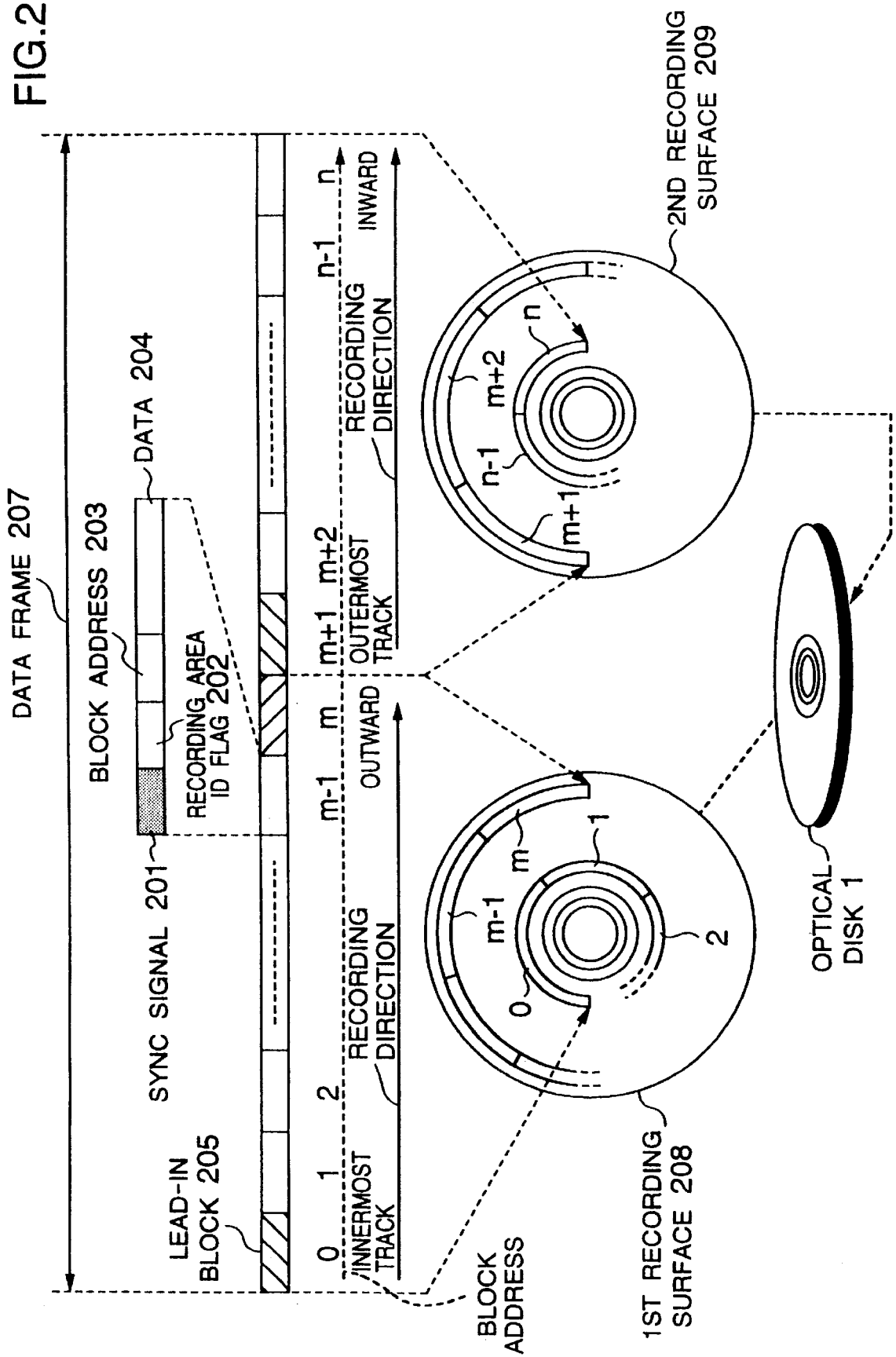

FIG.3

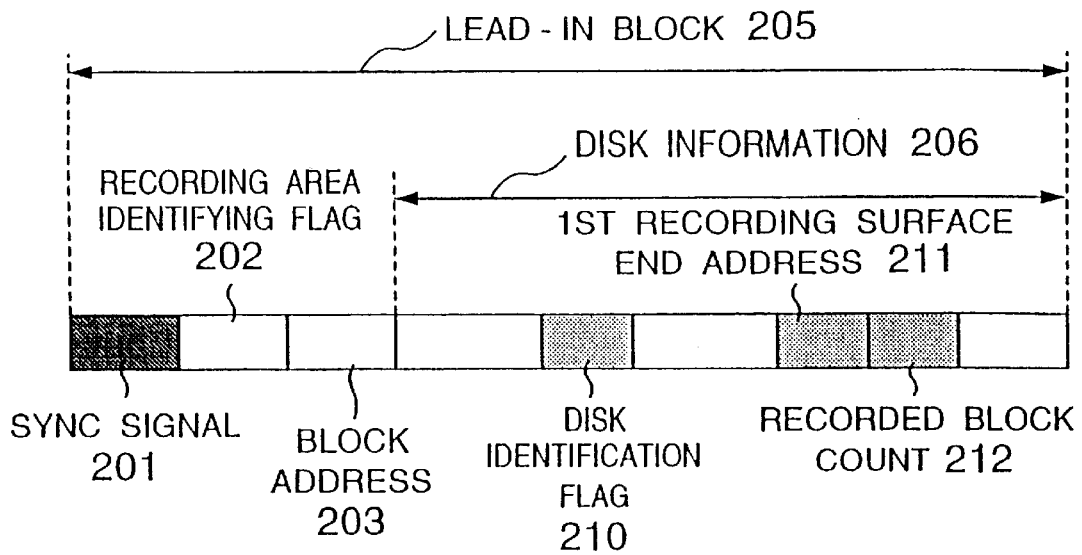

FIG.4

| DISK IDENTI-FICATION FLAG | RECORDING SURFACE COUNT | DATA FRAME RECORDING METHOD |
|---|---|---|
| 00 | 1 | ONE DATA FRAME IS RECORDED ON ONE RECORDING SURFACE |
| 10 | 2 | TWO DATA FRAMES ARE EACH RECORDED ON ONE RESPECTIVE RECORDING SURFACE |
| 11 | 2 | THE AREA OF ONE DATA FRAME IS DIVIDED INTO n BLOCKS. THE FIRST m BLOCKS ARE RECORDED ON A FIRST RECORDING SURFACE AND THE REMAINING BLOCKS ARE RECORDED ON A SECOND RECORDING SURFACE. m<n. |

METHOD FOR RECORDING DIGITAL SIGNALS ON MULTIPLE-LAYERED DISKS

CROSS-REFERENCES TO RELATED APPLICATIONS

This application is a continuation of application Ser. No. 09/084,931 filed on May 28, 1998, now U.S. Pat. No. 6,076,135 which is a division of application Ser. No. 08/669,245 filed on Jun. 24, 1996, now U.S. Pat. No. 5,966,721.

BACKGROUND OF THE INVENTION

The present invention relates to a digital signal recording method and a disk reproducing apparatus, and more particularly to such a method and an apparatus for recording a digital signal in the form of a data block on a disk adapted to be accessed by a host computer and for reproducing the digital signal from the disk.

A CD-ROM (CD-Read Only Memory) is a conventional example of this type of disk on which digital signals are recorded in units of a data block. Like the techniques described in *Nikkei Byte, September* 1994, p. 146, in the CD-ROM, data blocks composed of effective data and block addresses are recorded outward in order from the innermost track on the recording surface of the disk. When such a disk on which such data is recorded using the above technique is accessed and reproduced in accordance with a command from the host computer, a starting block address and a transfer block count are designated along with the access command, and desired data blocks are accessed and reproduced in accordance with such command and data.

Recently, disks each composed of two subdisks stuck to each other whose recording surfaces are readable from one side, disks having an upper recording surface and a lower recording surface whose recording surfaces are readable from one side, and disks each composed of two stuck-together sets of upper and lower recording surfaces which are readable from one side have been standardized. See, for example, the article "Confidence in Unique Standards of DVDs", *Nikkei Sanqyo Shinbun*, Feb. 24, 1995, and the article "Second Stage of Struggle for DVD Standards", *Nihon Keizai Shinbun*, Apr. 20, 1995.

When a digital signal is recorded using the above-mentioned technique on any of those disks having a plurality of recording surfaces, the host computer only recognizes the disks as having independent recording surfaces. In order to enable all of the recording surfaces to be accessed, the interface via which data is sent to and received from the host computer is required to be changed, and hence the conventional interface cannot be used as it is.

The above-mentioned technique has the problem that each time a recording surface to be reproduced is changed, it is necessary to read the innermost lead-in area before access and reproduction, such that it takes a long time to resume access and reproduction.

SUMMARY OF THE INVENTION

It is therefore an object of the present invention to provide a digital signal recording method and a disk reproducing apparatus which are capable of accessing at high speed all of the recording surfaces present in the disk and reproducing a digital signal using the conventional interface as it is.

In order to solve the above problem, in the digital signal recording method according to the present invention, a data frame is constructed which includes n (which is a natural number) data blocks recordable on a first digital signal recording surface and a second digital signal recording surface present on a disk and readable from one side of the disk, each data block being composed of a synchronization (sync) signal indicative of the boundary between the two data blocks, a block address indicative of the address of the data block on the recording medium, and data.

Further provided at the head of the data frame is a lead-in block having the same format as the data blocks and including information indicating the range of block addresses recorded on each of the recording surfaces of the disk, information indicating the configuration of the data frame, and a flag identifying a method for reproducing the data frame. The lead-in block and the data blocks of block addresses 1 to m (which is a natural number smaller than n) of the data frame are recorded on the first recording surface of the disk and the data blocks of block addresses (m+1) to n are recorded on the second recording surface of the disk. The disk has a multilayered structure with the corresponding recording surfaces. The first to m-th data blocks are arranged outward from the innermost track on the first recording surface and the (m+1)th to n-th data blocks are arranged inward from the outermost track on the second recording surface so as to enable the data blocks to be traced continuously.

The reproducing apparatus comprises means for processing a digital signal recorded on the disk in a predetermined format, means for sending/receiving commands and data to/from a host computer, means for controlling the whole apparatus in accordance with a command obtained by the sending/receiving means, means for moving a signal pickup to a desired position on the disk, means for controlling the focus of the signal pickup to access the recording surfaces selectively, means for controlling the rotational speed of a disk motor, means for detecting and recognizing the information included in the lead-in block indicating the range of block addresses recorded on a respective one of the recording surfaces of the disk, the information included in the lead-in block indicating the configuration of the data frame, and the flag included in the lead-in block identifying the method for reproducing the data frame, means for detecting the block address of a reproduced data block, means for calculating a block address at which the reproduction ends in accordance with a command from the host computer, and means for generating a command which controls the access to the disk and reproduction of a signal from the disk in accordance with the information obtained by the detection and recognition of the flag, the detected block address, and the result of the calculation.

According to such a structure, since consecutive block addresses are allocated to the respective data blocks recorded on all of the recording surfaces of the disk, all of the recording surfaces of the disk can be accessed and reproduced at high speed by using the conventional interface.

Other objects, features, and advantages of the invention will become apparent from the following detailed description of an embodiment of the invention taken in conjunction with the accompanying drawings.

BRIEF DESCRIPTION OF THE DRAWINGS

FIG. 1 shows the structure of one embodiment of a disk reproducing apparatus according to the present invention;

FIG. 2 illustrates the structure of a data frame used in the embodiment of FIG. 1;

FIG. 3 illustrates the structure of a lead-in block 205 of FIG. 2;

FIG. 4 illustrates the structure of a disk identification flag 210 of FIG. 3.

DESCRIPTION OF THE PREFERRED EMBODIMENT

Figure 5:
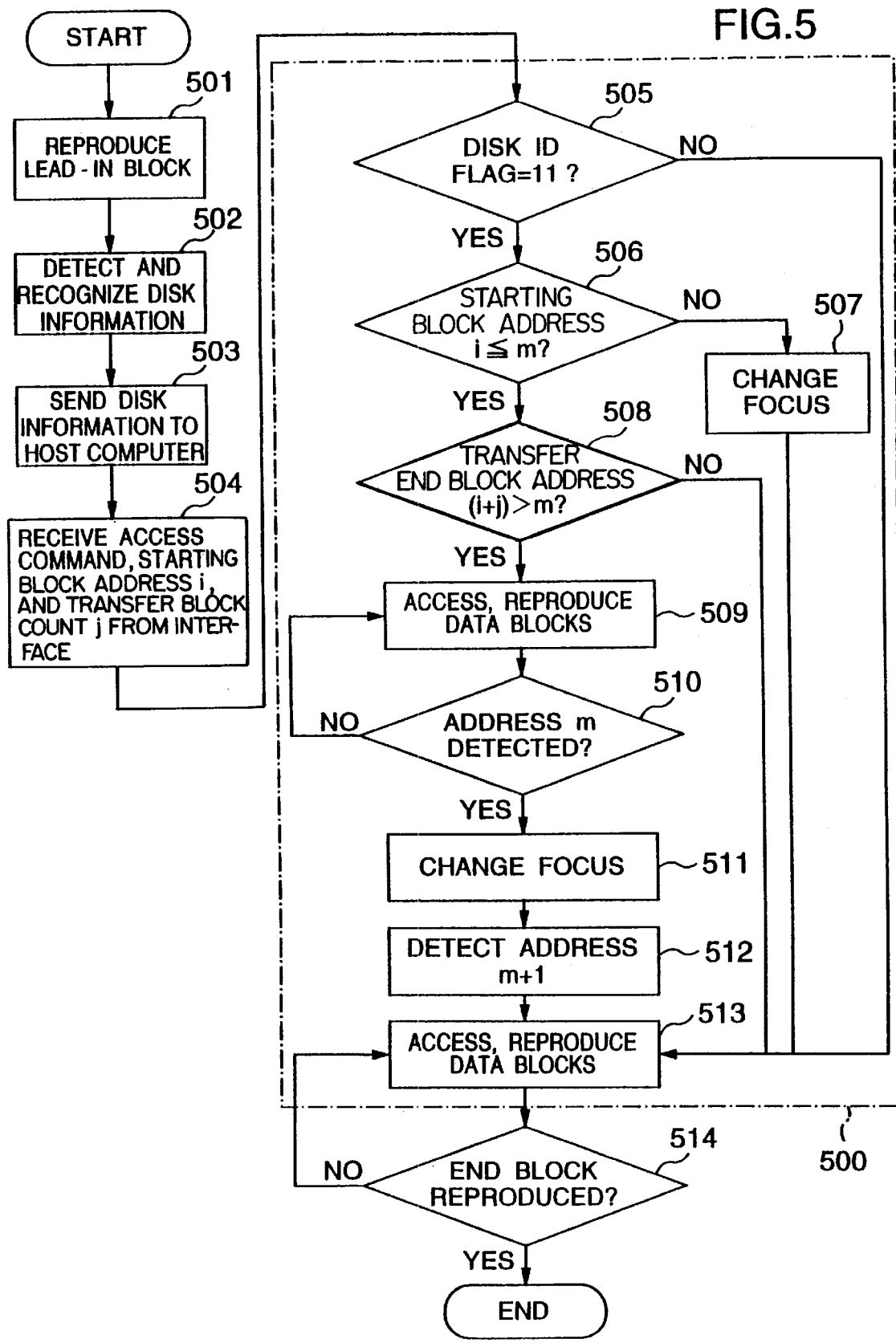
FIG. 5 is a flow chart indicative of an algorithm for signal processing in the embodiment of FIG. 1.

A preferred embodiment of the present invention will be described with reference to the drawings.

FIG. 1 shows the structure of one embodiment of a disk reproducing apparatus according to the present invention as a block diagram. Reference numeral 1 denotes an optical disk having multilayered recording surfaces (recording surfaces on two or more layers); 2, a disk motor; 3, a constant linear velocity (CLV) motor controller; 4, an optical pickup which is capable of changing its focus to access a specified one of the multilayered recording surfaces; 5, a preamplifier; 6, a pickup movement controller; 7, a focus controller; 8, a digital signal processor; 9, an interface; 10, an interface bus; 11, a host computer; 12, a system controller; 13, a disk information detection/recognition unit; 14, a block address detector; 15, a transfer end block address calculation unit; and 16, an access/reproduction controller. The functions of the elements 15 and 16 may be implemented by reading programs stored in a medium such as a ROM or a floppy disk and executing the programs with a processor.

In FIG. 1, the optical disk 1 contains digital signals recorded on the first and second recording surfaces of the disk readable from one side of the disk to be transferred to the host computer 11. The disk 1 is rotated at a constant linear velocity by the disk motor 2 controlled by the CLV motor controller 3 so that a digital signal is reproduced by the optical pickup 4 from the disk 1. At this time, tracking control of the optical pickup 4 is provided by the pickup movement controller 6 and focus control of the optical pickup 4 is provided by the focus controller 7 when one of the first and second recording surfaces is selected and accessed.

The structure of the optical disk 1 and the digital signal to be recorded will be described next with reference to FIGS. 2–4.

As shown in FIG. 2, one data block corresponding to a sector as a minimum unit which is recorded on the disk 1 is composed of a sync signal 201 indicative of the boundary between two data blocks, a recording area identification flag 202 which identifies an area on the disk in which the data block is to be recorded, a block address 203 indicative of the address of the data block on the disk, and data 204.

As described above, the disk has first and second recording surfaces readable from one side of the disk. N data blocks are arranged in order of recording on the disk and consecutive addresses 1 to n are stored at corresponding addresses 203 of the data blocks. A lead-in block 205 having a structure shown in FIG. 3 is provided at the head of the arrangement of the data blocks to thereby compose a data frame 207.

The lead-in block 205 is indicative of the constitution information of the data frame 207 and has a format similar to that of the data blocks. Disk information 206 is stored in a data area, and includes a disk identification flag 210 having a structure of FIG. 4 stored as part of the disk information 206. A frame head address 0 is stored at a block address 203.

When consecutive data frames 207 thus produced are recorded on the disk 1, the lead-in block at block address 0 and the data blocks at block addresses 1 to m (which is a natural number smaller than n) are recorded outward from the innermost track on the first recording surface 208. The data blocks at block addresses (m+1) to n are recorded inward from the outermost track on the second recording surface 209.

A flag "11" is stored as the disk identification flag 210, and a first recording surface end address 211 indicative of the address of a data block recorded last on the first recording surface and a recorded block count 212 indicative of a data block count n recorded on the disk are recorded as parts of the disk information 206.

A single optical disk is constituted which has the first and second recording surfaces superposed and recorded in the format mentioned above.

Reproduction of digital data from the disk 1 will be described next with reference to the block diagram of FIG. 1 and the flow chart of FIG. 5.

In FIGS. 1 and 5, the innermost track on the first recording surface of the disk 1 is accessed with the optical pickup 4 before reproduction of the recorded data to reproduce the lead-in block 205 (step 501 of FIG. 5), predetermined signal processing including detection of the sync signal 201 and error correction is performed in the digital signal processor 8, and the disk information 206 is detected and recognized in the disk information detection/recognition unit 13 (step 502). The detected disk information is delivered to the interface 9 which then delivers the disk information to the host computer 11 via the interface bus 10 in accordance with a predetermined protocol (step 503). The host computer 11 sends an access command, a starting block address i at which the data blocks are to start to be accessed, and a transfer block count j to the interface 9 in dependence on the received disk information and in accordance with a predetermined protocol (step 504).

When the interface 9 receives a command from the host computer 11, the access/reproduction controller 16 controls the access and reproduction in accordance with the disk identification flag 210 of the disk information 206 detected previously.

If the detected disk identification flag 210 is other than the flag "11" indicative of a recording format to be dealt with in the present invention (step 505), the access/reproduction controller 16 delivers to the system controller 12 a control command to reproduce j data blocks of consecutive addresses starting from the starting block address i on the disk. The system controller 12 then controls the CLV motor controller 3 and the pickup movement controller 6 to perform access/reproduction (steps 513 and 514). The reproduced data is then sent to the host computer 11 via the digital signal processor 8, the interface 9, and the interface bus 10.

If the detected disk identification flag 210 is "11", it is determined that the disk has been recorded using the method of FIG. 2. At step 506, the starting block address i is compared in magnitude with the outermost track block address m of the first recording surface obtained by detection of the first recording surface end address 211 of the disk information 206 to select a recording surface at which the access is to be started. If i is greater than m, the block address at which the access is to be started is present on the second recording surface. Thus, the focus of the optical pickup 4 is changed (step 507), and j data blocks of consecutive addresses starting from the starting block address i on the second recording surface are accessed and reproduced (steps 513 and 514). In order to change the focus, the conventional technique disclosed, for example, in *Nikkei Byte*, September 1995, pp. 129–130, FIG. 2, may be used.

If i is not larger than m, the starting block address i exists on the first recording surface. Thus, the transfer end block address calculation unit 15 calculates the transfer end block address (i+j) where the reproduction is to end on the basis of the starting block address i and the transfer block count j. The result of the calculation (i+j) is compared with the recorded block count n obtained by detection of the recorded block count 212 of the disk information 206 in the access/reproduction controller 16. If (i+j) is greater than n, the reproduction ends midway and the inability to reproduce the digital signal is reported via the interface 9 to the host computer 11.

The result of the calculation is compared with the outermost track block address m on the first recording surface at step 508. If (i+j) is not greater than m, it is determined that all of the data blocks to be reproduced are on the first recording surface. Thus, j data blocks of consecutive addresses starting from the starting block address i on the first recording surface are accessed and reproduced (steps 513 and 514).

If (i+j) is greater than m, it is determined that the data blocks to be reproduced exist in succession over the first and second recording surfaces. In this case, the data blocks are first started to be accessed at the starting block address i on the first recording surface and continue to be reproduced until a block address m is detected by the block address detector 14 (steps 509, 510). When the block address m is detected, the focus of the optical pickup 4 is changed to access the second recording surface (step 511) and a data block at a block address (m+1) existing on the outermost track of the second recording surface is reproduced to detect the block address (m+1) (step 512). Access to and reproduction of data blocks starting at the block address (m+1) is then performed (step 513) until the data block at the transfer end block address (i+j) is reproduced (step 514). The block 500 including the steps 505–513 fulfills the functions of the elements 15 and 16 of FIG. 1. Programs corresponding to the respective steps in the block 500 are stored in a recording medium as mentioned above.

As described above, in the present embodiment, when a digital signal is recorded on a disk which has the first and second recording surfaces readable from one side thereof, n data blocks recordable throughout all of the recording surfaces of the disk are arranged in order of recording, and a lead-in block containing disk information is provided at the head of the arrangement of the n data blocks to thereby compose a data frame. The lead-in block and the data blocks of block addresses 1 to m are recorded outward from the innermost track on the first recording surface and the data blocks of block addresses (m+1) to n are recorded inward from the outermost track on the second recording surface. Thus, since the consecutive block addresses are assigned throughout all of the recording surfaces of the disk, all of the recording surfaces of the disk can be accessed and reproduced while employing the conventional interface.

The reproducing apparatus detects disk information recorded in the lead-in block and controls the system controller in accordance with the detected disk information to thereby access and reproduce information in the disk recorded in the present embodiment.

When the data blocks are reproduced continuously throughout the first and second recording surfaces in the recording method of this embodiment, the amount of movement of the pickup is minimized to thereby achieve high-speed access to the second recording surface.

While in the present embodiment the disk which has the first and second recording surfaces readable from one side thereof has been illustrated, the present invention is not limited to this particular case. For example, the present invention is applicable to disks which have three or four surfaces readable from one side thereof. In this case, when, for example, the data blocks to be recorded continue from the second recording surface to the third recording surface, the data blocks are assigned outward from the innermost track on the third recording surface for recording or reproducing purposes.

The structure and storage position of the disk identification flag 210 and the storage positions of the first recording surface end address 211 and the recorded block count 212 included in the disk information 206 are not limited to the particular disclosed embodiment, but may be modified depending on the various disk types.

The recording directions of the data frame on the first and second recording surfaces are not limited to those illustrated in the embodiment. The arrangement to be employed is required to minimize the amount of movement of the pickup between the recording surfaces. For example, consecutive data blocks may be recorded inward from the outermost track on the first recording surface and then recorded outward from the innermost track on the second recording surface.

What is claimed is:

1. A method of recording digital signals on a disk, the disk having at least a first recording surface and a second recording surface, the digital signals being in the form of a data frame, the data frame including at least a lead-in block and n data blocks (n is a natural number), the lead-in block having a same format as the n data blocks, the method comprising the steps of:

assigning n block addresses to respective ones of the n data blocks;

assigning, to each of the n data blocks, information identifying an area on the disk in which a respective one of the n data blocks is to be recorded;

recording m data blocks (m is a natural number, 0<m<n) of the n data blocks on the first recording surface of the disk;

recording remaining (n–m) data blocks of the n data blocks on the second recording surface of the disk; and recording the lead-in block at the head of the data frame, the lead-in block including information identifying an area on the disk in which the lead-in block is to be recorded, information identifying a number of recording surfaces, information identifying the block address of one of the m data blocks recorded last on the first recording surface, and information identifying the block address of a last one of the n data blocks in the data frame.

2. A method according to claim 1, wherein the m data blocks are recorded on the first recording surface of the disk in a first radial direction of the disk; and wherein the remaining (n–m) data blocks are recorded on the second recording surface of the disk in a second radial direction of the disk opposite to the first radial direction of the disk.

3. A method according to claim 1, wherein the first recording surface and the second recording surface are both readable from a same side of the disk by a single optical pickup.

4. A method according to claim 1, wherein the information identifying an area on the disk in which a respective one of the n data blocks is to be recorded includes information representing a recording surface of the disk.

5. A method according to claim 1, wherein the information identifying an area on the disk in which a respective one of the n data blocks is to be recorded includes information representing a type of block.

\* \* \* \* \*